US008060484B2

(12) United States Patent
Bandera et al.

(10) Patent No.: US 8,060,484 B2
(45) Date of Patent: Nov. 15, 2011

(54) GRAPHICAL USER INTERFACE FOR DATA MANAGEMENT

(75) Inventors: Deborah H. Bandera, Austin, TX (US); Denise Ann Bell, Austin, TX (US); Alex Dudley Little, Raleigh, NC (US); Billy Brooks York, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 11/835,097

(22) Filed: Aug. 7, 2007

(65) Prior Publication Data

US 2009/0043751 A1 Feb. 12, 2009

(51) Int. Cl.
G06F 7/00 (2006.01)
(52) U.S. Cl. .................. 707/705; 707/661
(58) Field of Classification Search .......... 707/661, 707/705
See application file for complete search history.

(56) References Cited

U.S. PATENT DOCUMENTS

| | | | |
|---|---|---|---|
| 5,724,567 A | 3/1998 | Rose et al. | |
| 5,861,891 A | 1/1999 | Becker | |
| 6,384,847 B1 * | 5/2002 | Rabenhorst | 715/804 |
| 6,400,366 B1 | 6/2002 | Davies et al. | |
| 6,785,676 B2 * | 8/2004 | Oblinger | 707/705 |
| 6,996,568 B1 | 2/2006 | Bedell et al. | |
| 7,075,550 B2 * | 7/2006 | Bonadio | 345/589 |
| 7,127,475 B2 * | 10/2006 | Gotz et al. | 1/1 |
| 7,134,093 B2 | 11/2006 | Etgen et al. | |
| 7,151,549 B2 | 12/2006 | Kudo et al. | |
| 7,403,942 B1 * | 7/2008 | Bayliss | 707/748 |
| 7,822,762 B2 * | 10/2010 | Payne et al. | 707/765 |
| 7,844,609 B2 * | 11/2010 | Kenedy et al. | 707/737 |
| 7,937,393 B2 * | 5/2011 | Prahlad et al. | 707/741 |
| 2004/0028277 A1 | 2/2004 | Schermer et al. | |
| 2005/0203888 A1 * | 9/2005 | Woosley et al. | 707/705 |
| 2005/0278656 A1 * | 12/2005 | Goldthwaite et al. | 715/810 |
| 2008/0098045 A1 * | 4/2008 | Radhakrishnan et al. | 707/203 |
| 2010/0070448 A1 * | 3/2010 | Omoigui | 706/47 |
| 2010/0251230 A1 * | 9/2010 | O'Farrell et al. | 717/173 |

FOREIGN PATENT DOCUMENTS

JP 60-207040 10/1985

OTHER PUBLICATIONS

Sohail S. Hussaini, "Simple Bar Graph Displays for Control Variables and Alarm Status," Electro/94 International, conference Proceedings. May 10-12, 1994. pp. 651-656.*

(Continued)

Primary Examiner — Shahid Alam
Assistant Examiner — Alexandria Bromell
(74) Attorney, Agent, or Firm — Yee & Associates, P.C.; Jeffrey S. LaBaw (57) ABSTRACT

The exemplary embodiments provide a computer implemented method, apparatus, and computer usable program code for managing data. A user interface is generated. A user makes a selection at the user interface of at least one data type of a set of data types to be measured for relevancy. The set of data types comprise an age of data, modification of data, and access of data. The user also selects, at the user interface a granularity of the at least one data type to be measured. Data is collected from multiple sources. The collected data is analyzed to determine a relevance for the data type selected by the user based on the granularity selected by the user, which forms a result. The result is displayed to the user, by the user interface. The result includes a visual representation of the relevance of the data type selected by the user based on the granularity selected by the user.

18 Claims, 8 Drawing Sheets

OTHER PUBLICATIONS

Sohail S. Hussaini, "Simple Bar Graph Displays for Control Variables and Alarm Status," Electro/94 International, Conference Proceedings. May 10-12, 1994. pp. 651-656.*

Hussaini, "Simple Bar Graph Displays for Control Variables and Alarm Status", Electro/94 International, Conference Proceedings, Combines Volumes, May 1994, pp. 651-656.

U.S. Appl. No. 11/835,115, filed Aug. 7, 2007, Bandera et al.

* cited by examiner

GRAPHICAL USER INTERFACE FOR DATA MANAGEMENT

BACKGROUND OF THE INVENTION

1. Field of the Invention

The present invention relates generally to data processing systems. More specifically, the present invention relates to data management.

2. Description of the Related Art

Computer environments are increasing in size and complexity. Systems management administrators need to review, consolidate, and manage data from many different sources. With the introduction of Information Technology Infrastructure Library (ITIL), which is heavily reliant on a centralized database, the Configuration Management Database (CMDB) systems management administrators will face increasing challenges in integrating data.

There is a high probability of duplicate data records when aggregating data from several different systems management tools into a single view. The systems management administrators need a mechanism to assess, with confidence, the accuracy and validity of these duplicate records.

Currently there are no good tools to help the user determine what data records are most valid and which records need to be deleted or ignored.

SUMMARY OF THE INVENTION

The exemplary embodiments provide a computer implemented method, apparatus, and computer usable program code for managing data. A user interface is generated. A selection is received from a user, by the user interface, of at least one data type of a set of data types to be measured for relevancy, the set of data types comprising an age of data, modification of data, and access of data. A selection is received from the user, by the user interface, for a granularity of the at least one data type to be measured. Data is collected from multiple sources. The collected data is analyzed to determine a relevance for the data type selected by the user based on the granularity selected by the user, which forms a result. The result is displayed to the user, by the user interface, wherein the result includes a visual representation of the relevance of the data type selected by the user based on the granularity selected by the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
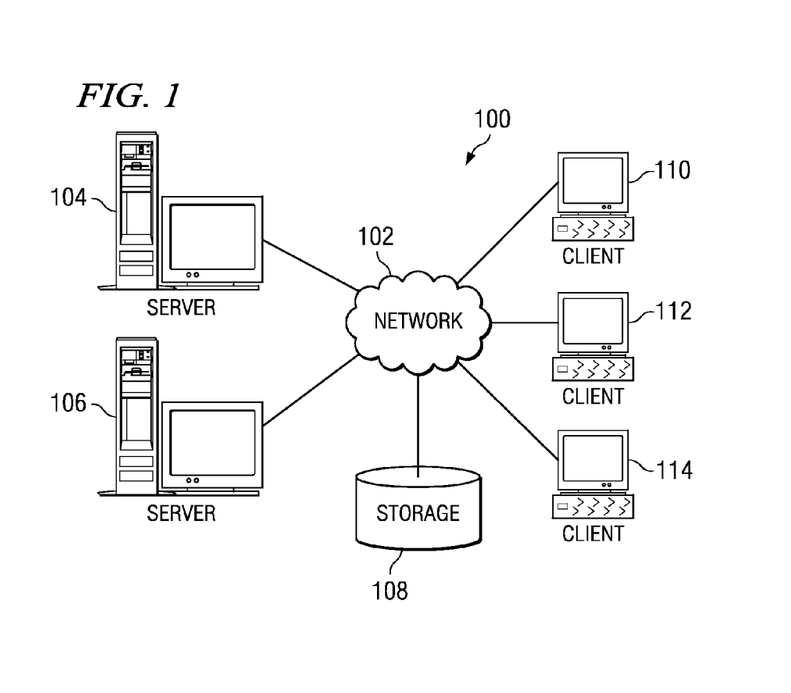
FIG. 1 depicts a pictorial representation of a distributed data processing system in which the illustrative embodiments may be implemented.
Figure 2:
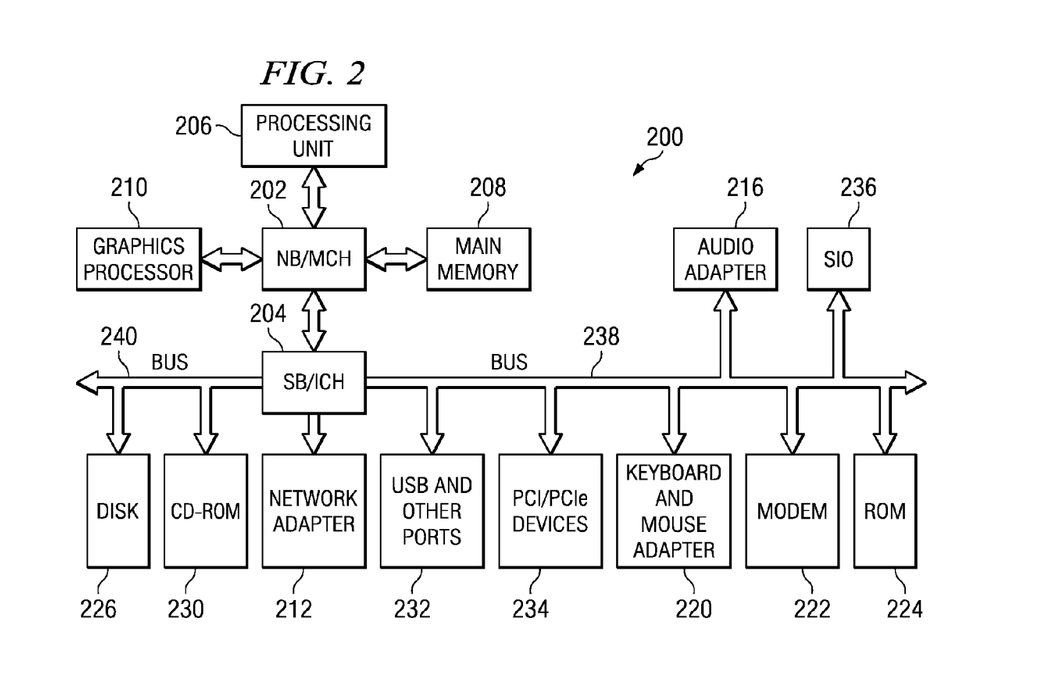
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary, and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system, and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
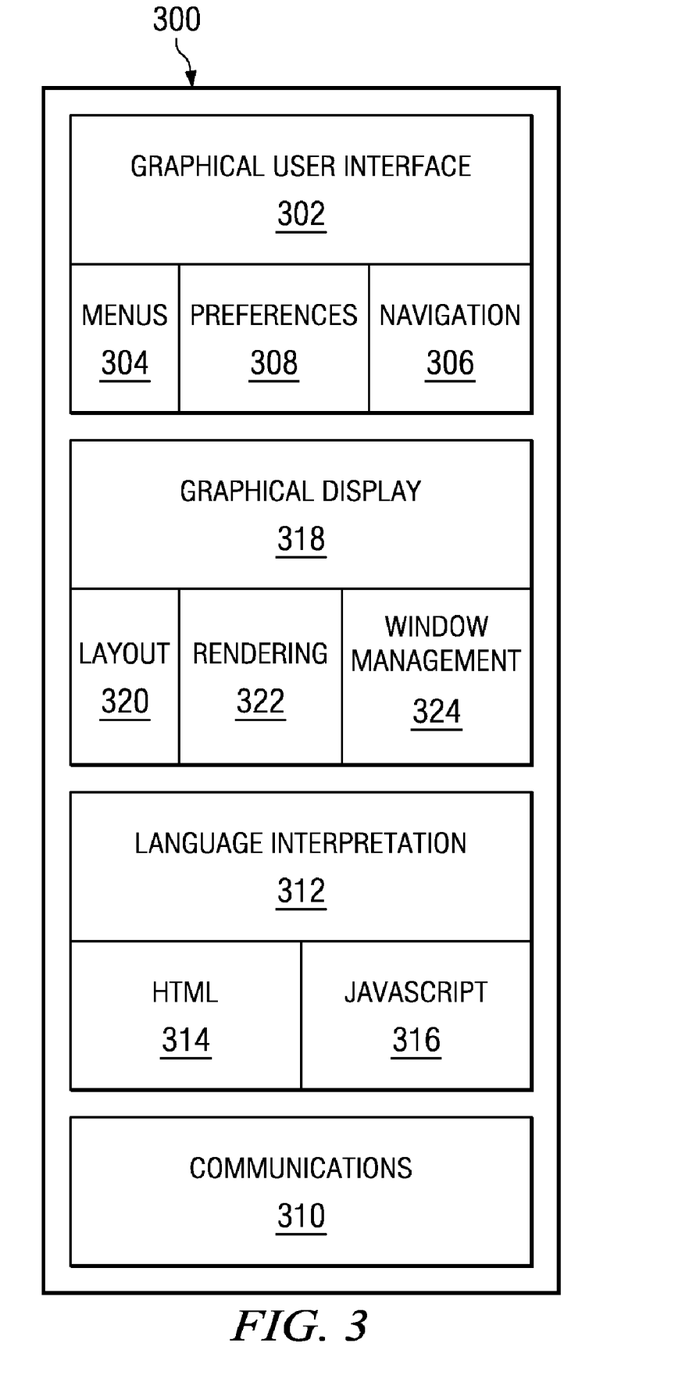
FIG. 3 is a block diagram of a browser program.

Turning next to FIG. 3, a block diagram of a browser program is depicted. A browser is an application used to navigate or view information or data in a distributed database, such as the Internet or the World Wide Web.

In this example, browser 300 includes graphical user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communications 310 uses hypertext transfer protocol (HTTP). Other protocols may be used depending on the implementation. Documents that are received by browser 300 are processed by language interpretation 312, which includes HTML 314 and JavaScript 316. Language interpretation 312 will process a document for presentation on graphical display 318. In particular, HTML statements are processed by HTML 314 for presentation while JavaScript statements are processed by JavaScript unit 316.

Graphical display 318 includes layout 320, rendering 322, and window management 324. These units are involved in presenting web pages to a user based on results from language interpretation 312.

Browser 300 is presented as an example of a browser program in which illustrative embodiment may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation while Microsoft Internet Explorer is available from Microsoft Corporation.

Currently, when faced with data collected from multiple sources, no good tools exist to help a user determine what data records are most valid and which ones need to be deleted or ignored. Exemplary embodiments provide a user, such as a systems management administrator, with an intuitive graphical view that displays historical data related to the ITIL Change Management process. With just a glance, the systems management administrator will be able to determine, with a level of confidence, which of the duplicate records is most accurate.

Exemplary embodiments enable the user to define the data types and characteristics that should be monitored and displayed in the CMDB view(s). When data is consolidated from numerous locations and sources, there are some specific attributes that could be surfaced to help the user determine what needs focus and attention. Some examples of these attributes are the age of the data, the frequency with which the data record has been accessed and the frequency with which the data record has been changed.

A record that has been updated frequently and that is frequently accessed is more likely to be a valid record than one that has been accessed or updated rarely. Thus, the attributes act as filters that are applied to the records in order to indicate the possible validity or relevancy of the data record.

Figure 4:
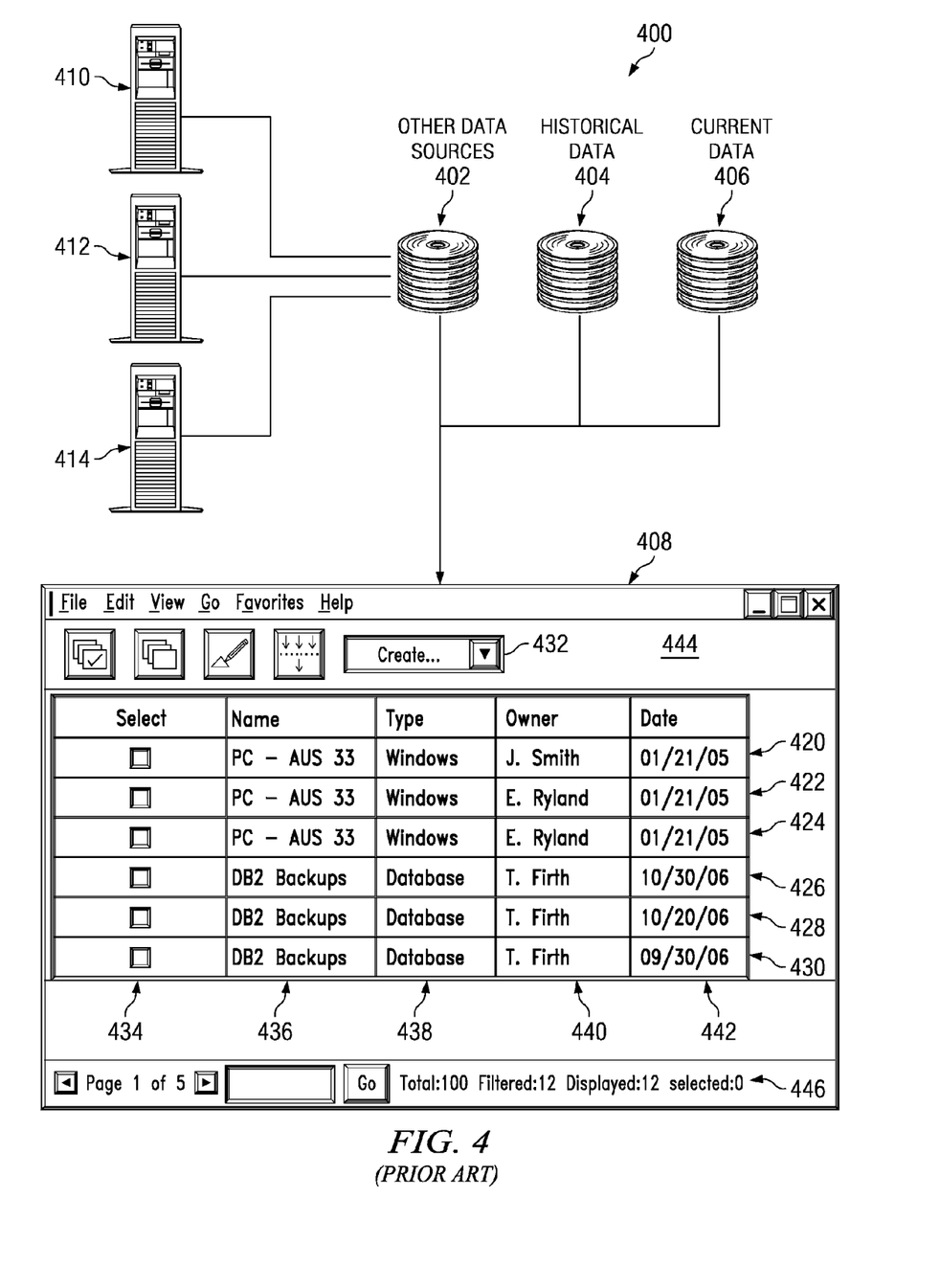
FIG. 4 depicts a prior art system for managing collected data.

Turning back to the Figures, FIG. 4 depicts a prior art system for managing collected data. System 400 comprises other data sources 402, historical data 404 and current data 406. Other data sources 402 include remote databases 410, 412, and 414. Information collected from the various data sources is displayed to the user through an interface such as table of data 408.

Table of data 408 comprises a menu bar 444, a summary bar 446, and a group of displayed records, records 420, 422, 424, 426, 428, and 430, between the menu and summary bars. Each record is comprised of several fields that are displayed to the user. In the present example, the fields presented to the user are a selection field 434, name 436, type 438, owner 440, and date 442. Each of the fields, name 436, type 438, owner 440, and date 442, provide information to the user so that the user may decide which record or records to select via selection field 434.

Menu bar 444 allows the user to select various functions and types of records to display. In the depicted example, drop down box 432 allows the user to choose what actions the user can take on the records that are displayed and summarized in summary bar 446. In the present example, "Create" record is chosen as the user action that is desired.

This type of summary and display is not very useful in helping a user to determine which records out of the collected records are most relevant or most valid. The current user interfaces do not include these proposed data comparison and validity features.

In the ITIL environment, Change Management has a clearly defined role of great importance. Based on the information that is collected from a Change Management point of view, exemplary embodiments use the collected data to help the user determine which records are valid or are the most relevant records. Exemplary embodiments achieve this goal by providing more information about the data. This additional information may include the age of the data as well as the frequency of the access or changes to the data. The attributes chosen function as filters that help to determine the relevance of a particular record.

Presenting this information in one user interface (UI) will help the user do the research needed to select the appropriate records, and eliminate the redundant or old information.

One exemplary embodiment indicates data from numerous data sources with text and graphics that represent the following information: (i) data age, (ii) modification, such as the last change and the frequency, and (iii) access, such as the last read and the frequency. Drop down menu options allow the user to determine the scope/granularity of the data records.

For example, the data age attribute may be arranged chronologically from the oldest data in the database to the newest. Optionally, other granularities may be selected, such as granularities based on a period of time, such as yearly, monthly, daily, hourly, and so forth. Alternatively, the data could be arranged from newest to oldest. The modification of the data may be sorted according to last change and frequency, such as never, yearly, monthly, daily, hourly, and so forth. Access to the data may be sorted according to last read and frequency, such as never, yearly, monthly, daily, hourly, and so forth.

In other words, the age of the data, the modification of the data, and the access to the data may be thought of as data types that are to be examined while the scope/granularity of the data type may be referred to, or thought of, as the characteristics of the data types.

These data types function as filters that help to determine the validity or relevance of a particular record. The characteristics determine the parameters of the filtering. For example, a user may choose to filter records based on the frequency of modification of the data. The user may decide to set the filter's granularity as monthly. Based on these choices, the data records are analyzed for how often the record has been modified. Data records that have been modified on at least a monthly basis or even more frequently will be given an indication of highest relevance or validity. Those records that have been modified less frequently than monthly will be given an indicator of their relevancy based on how frequently the record has been modified in comparison to the standard of monthly.

Graphical views make it much faster and easier for a user or users to scan the data presented and determine what items need the most attention based on the age, frequency of access, and frequency of change. By using a combination of indicators, exemplary embodiments allow a user to determine the importance and/or impact that a particular data item has in the environment. Providing the ability to let the user select the data fields that are most appropriate for their given task or environment will allow much faster handling of duplicate and/or redundant records.

Figure 5:
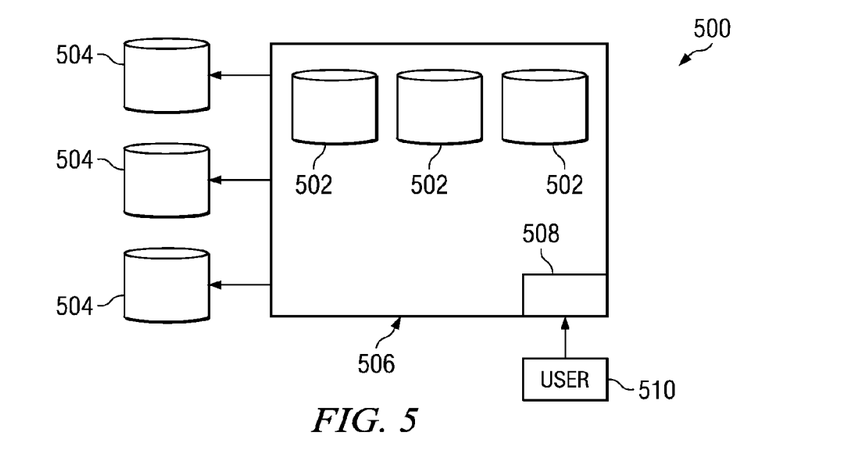
FIG. 5 is a block diagram illustrating a system for indicating the relevance and/or validity of data for a configuration management database environment, according to an exemplary embodiment.

Turning back to the figures, FIG. 5 is a block diagram illustrating a system for indicating the relevance and/or validity of data for a configuration management database environment, according to an exemplary embodiment. System 500 comprises local (internal) data sources 502, remote data sources 504, data processing system 506, and user interface 508. Data processing system 506 may be implemented as data processing system 200 of FIG. 2. Local data sources 502 and remote data sources 504 comprise various types of data sources including, but not limited to, databases, both relational databases and non-relational databases, spreadsheets, documents, and so forth.

Information collected from local data sources 502 and remote data sources 504 is displayed to user 510 through user interface 508. User interface 508 allows user 510 to define what data types and characteristics the user wants to be monitored and displayed.

Figure 6:
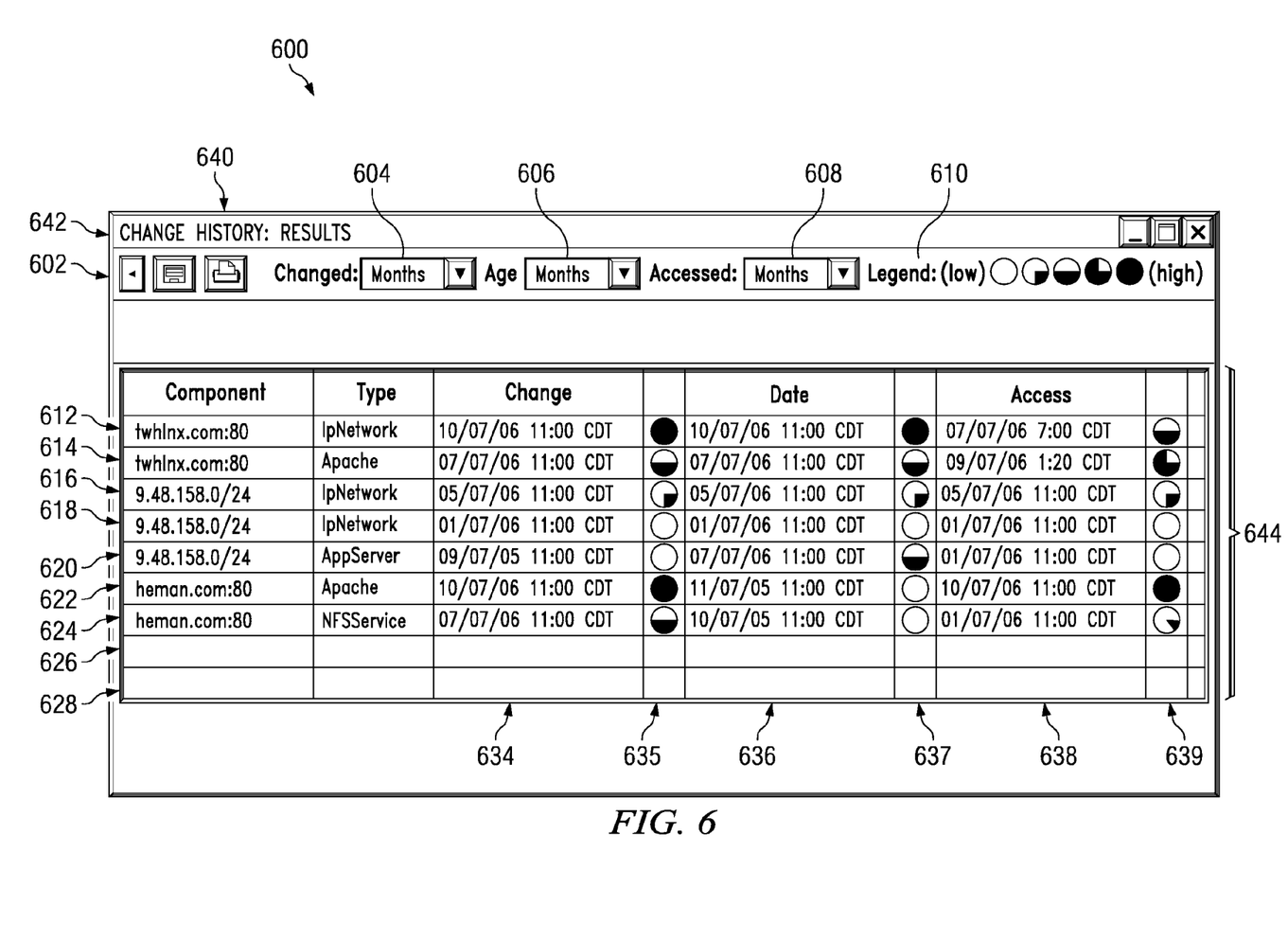
FIG. 6 illustrates an interface for indicating the relevance and/or validity of data for a configuration management database environment, according to an exemplary embodiment.

FIG. 6 illustrates an interface for indicating the relevance and/or validity of data for a configuration management database environment, according to an exemplary embodiment. User interface 600, which may be implemented as user interface 508 of FIG. 5, comprises display area 640. Display area 640 comprises title bar 642, menu bar 602 and records area 644.

It should be noted that display area 640 is presented as an example for explanation purposes only. Those skilled in the art will realize various other possible configurations of display area 640 other than the example presented. Such other arrangements could include the absence of the title bar, or placement of the title bar in other locations. The menu bar may be moved or contain options and commands other than those shown in the present example. Furthermore, display area 640 may include a summary bar or summary area. The present exemplary embodiment is not intended to be limited to the specific example shown. Rather various exemplary embodiments contemplate all such variations.

In the present exemplary embodiment, menu bar 602 comprises buttons, for backing up, saving the data, printing the data, legend 610, changed field 604, age field 606, and accessed field 608. In the present exemplary embodiment changed field 604, age field 606, and accessed field 608 are depicted as drop down menus, but other alternate embodiments are possible and contemplated by various exemplary embodiments.

A user selects at what granularity to measure the change, age and access via changed field 604, age field 606, and accessed field 608. In the present exemplary embodiment, the user has set all the fields to "months" in order to determine the relevance or validity of the data. It should be noted that not all three fields have to be set. A user could choose to determine relevancy or validity of the data based on only or two of the fields.

Furthermore, while the depicted example shows the selection of monthly for all fields, not all the fields have to be the same. In alternate embodiments, each field is set to different granularities. Among possible settings are never, yearly, monthly, daily, hourly, and so forth.

Legend 610 is a graphical representation of the relevance or validity of the data based on the criteria selected in changed field 604, age field 606, and accessed field 608. In the present exemplary embodiment, a circle is used with one-quarter increments to indicate the validity or relevancy of the data record in regards to the attributes selected as a filter, with an empty circle being an indicator of the lowest relevance and a full circle being an indicator of the highest relevance. This enables the user to do a quick visual scan, locating the types of data they consider most important/relevant.

In an alternate embodiment, the legend is reversed, with a full circle being the lowest relevance and an empty circle being the highest. Furthermore, in other alternate embodiments, finer granularities are used to depict relevance. In one alternate embodiment, the increment is one-eighth. In another alternate embodiment, the increment is one-sixteenth.

In the present exemplary embodiment, records area 644 comprises records 612, 614, 616, 618, 620, 622, and 624 and empty rows 626 and 628. Each record comprises various attributes, of which the attributes entitled component, type, change 634, date 636, and access 638 are shown in records area 644.

Changed field 604, age field 606, and accessed field 608 act as filters for analyzing these data records that have been collected from multiple resources and displayed in records area 644. Thus, a user still chooses what actions the user can take on the records that are displayed in records area 644 and changed field 604, age field 606, and accessed field 608 then function as filters that are used to indicate the validity or relevance of these records.

Change 634 attribute corresponds to changed field 604. Date 636 attribute corresponds to age field 606. Access 638 attribute corresponds to accessed field 608. Change 634, date 636, and access 638 attributes of each record show the date and time when the last event of the appropriate type occurred.

Columns 635, 637, and 639 show the graphical representation of the relevance of the record based on the criteria selected for the attribute.

Thus, column 635 shows the relevance of change 634 attribute based on the criteria selected in changed field 604 of menu bar 602. Likewise, column 637 shows the relevance of date 636 attribute based on the criteria selected in age field 606 of menu bar 602. Column 639 shows the relevance of access 638 attribute based on the criteria selected in accessed field 608 of menu bar 602.

Therefore, for example, a user could look quickly at record 612 and see that the record has high relevancy in regards to both the age of the data and the modification of the data, the changed and aged fields, but only medium relevance in regards to access. The same user could quickly see that record 622 has high relevance in terms of modification and access, the changed and accessed fields, but record 622 also has lowest relevance in terms of the age of the data. Thus, the user can quickly decide which data he or she believes to be more valid based on the criteria.

Figure 7:
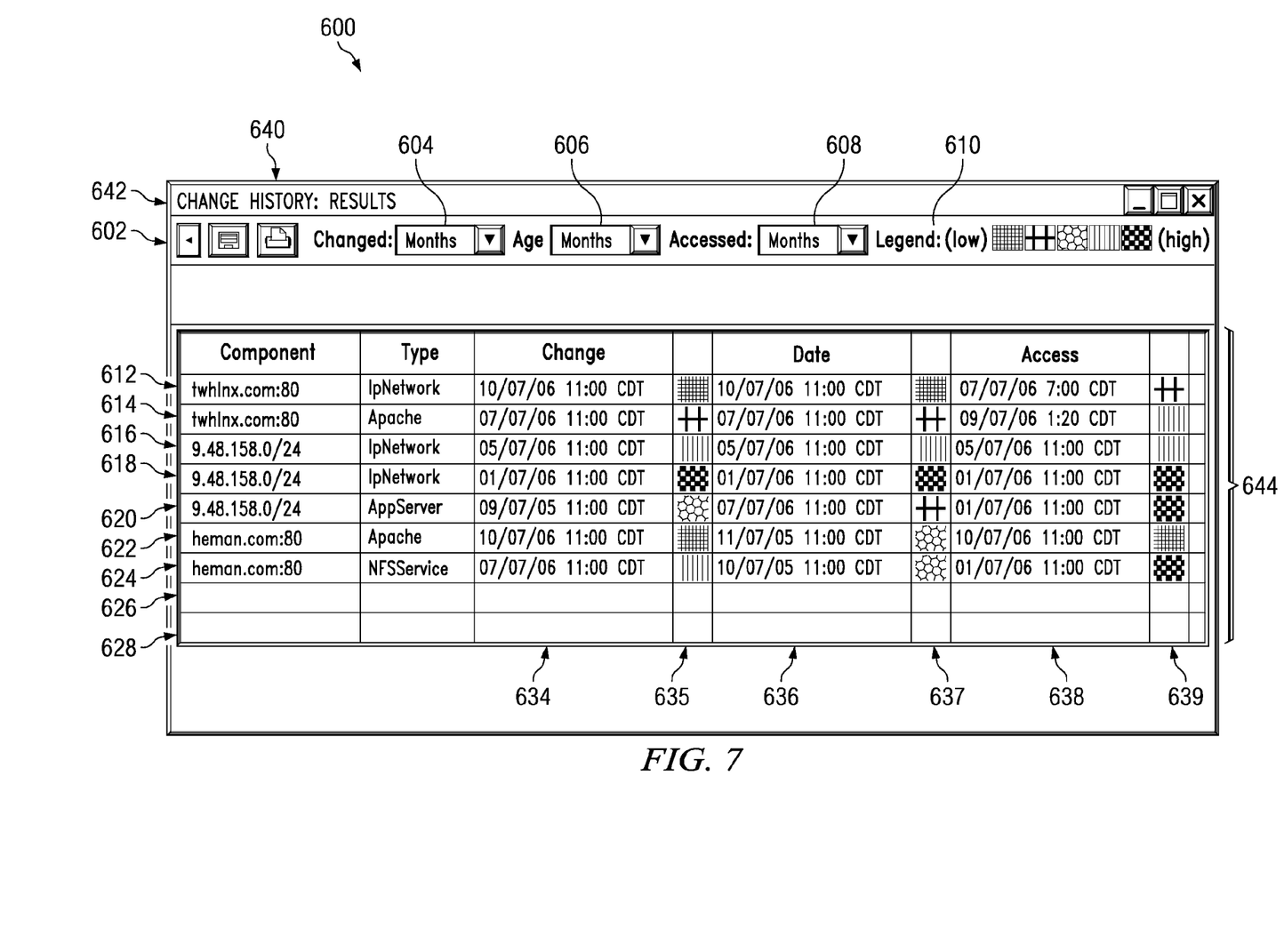
FIG. 7 illustrates an interface for indicating the relevance and/or validity of data for a configuration management database environment, according to an alternate embodiment.
Figure 8:
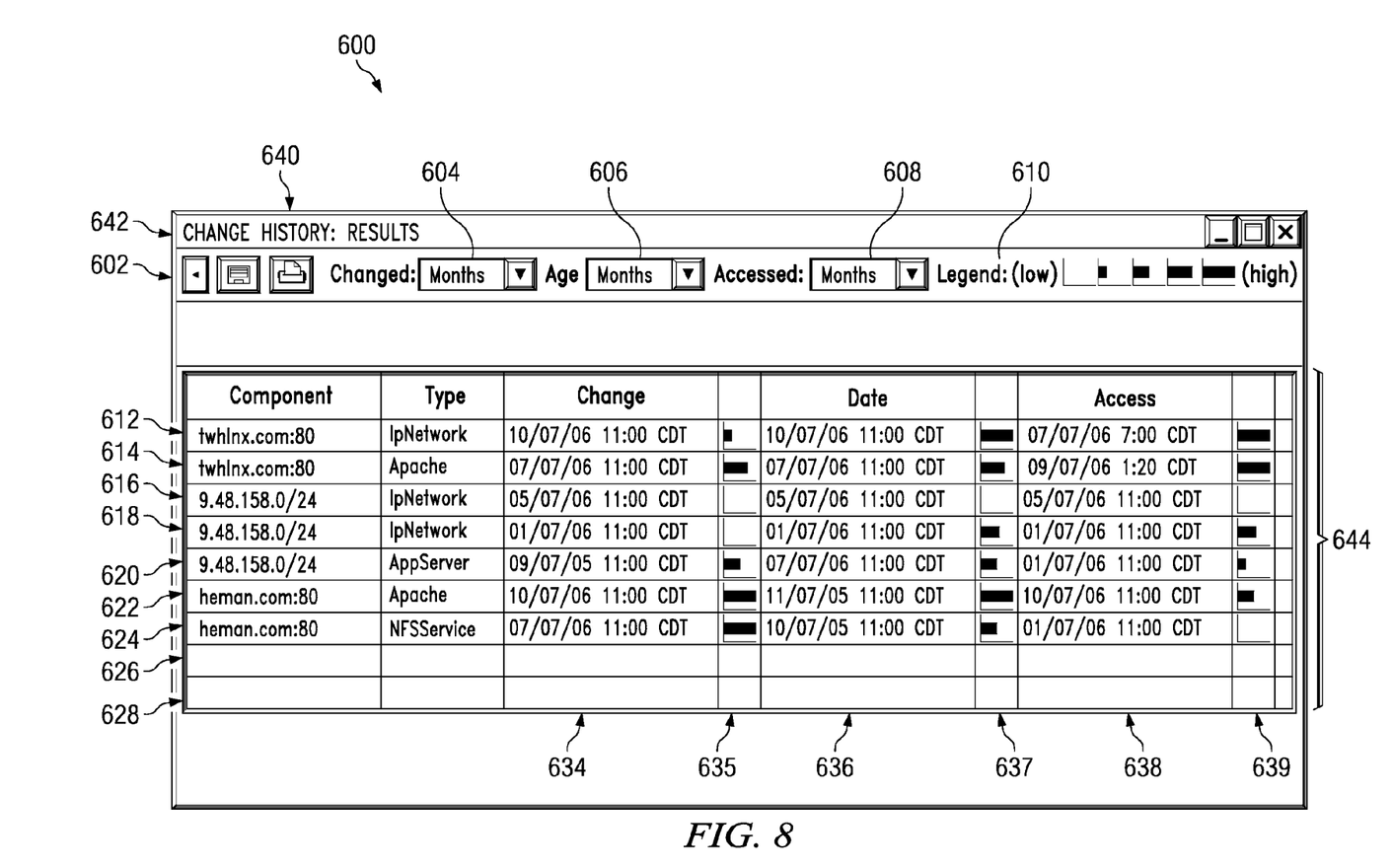
FIG. 8 illustrates an interface for indicating the relevance and/or validity of data for a configuration management database environment, according to an alternate embodiment.
Figure 9:
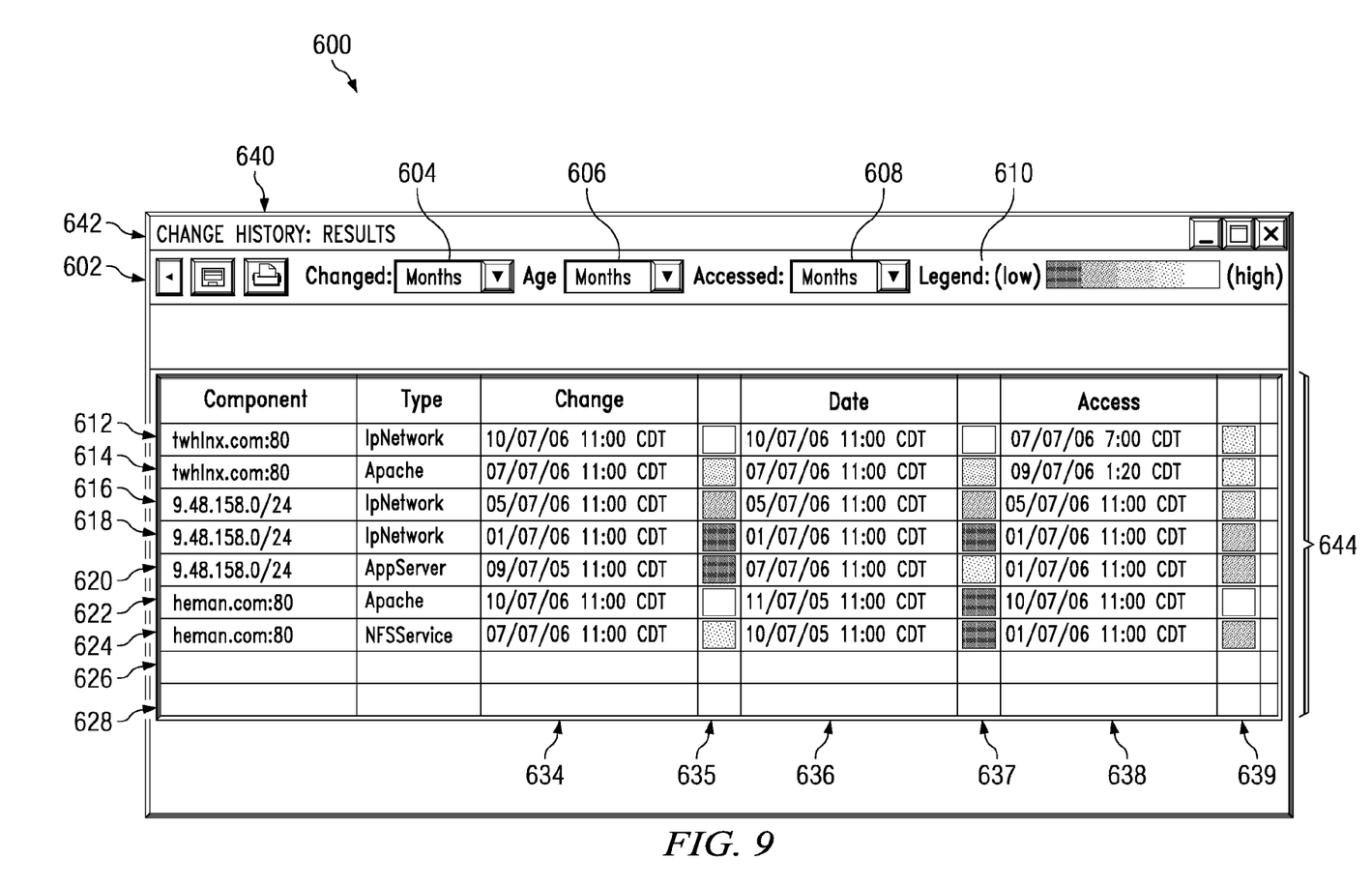
FIG. 9 illustrates an interface for indicating the relevance and/or validity of data for a configuration management database environment, according to an alternate embodiment.

FIGS. 7-9 show the same user interface as FIG. 6, but show alternate ways of graphically representing the relevance of the data.

FIG. 7 illustrates an interface for indicating the relevance and/or validity of data for a configuration management database environment, according to an alternate embodiment. FIG. 7 shows user interface 600 of FIG. 6 but with a different graphical representations for use in the legend to rate the relevance of the record attributes. Thus, similar reference numerals are used to represent similar components. In FIG. 7, legend 610 comprises various graphical patterns to represent the relevance of the attribute being measured.

FIG. 8 illustrates an interface for indicating the relevance and/or validity of data for a configuration management database environment, according to an alternate embodiment. FIG. 8 shows user interface 600 of FIG. 6 but with a different graphical representations for use in the legend to rate the relevance of the record attributes. Thus, similar reference numerals are used to represent similar components. In FIG. 8, legend 610 comprises a horizontal bar graph to represent the relevance of the attribute being measured. The longer the bar in the graph, the more relevant the data is in relation to the attribute being measured.

FIG. 9 illustrates an interface for indicating the relevance and/or validity of data for a configuration management database environment, according to an alternate embodiment. FIG. 9 shows user interface 600 of FIG. 6 but with a different graphical representations for use in the legend to rate the relevance of the record attributes. Thus, similar reference numerals are used to represent similar components. In FIG. 9, legend 610 comprises various colored or shaded blocks to represent the relevance of the attribute being measured. In the present example, the darker the color or shade of the black, the less relevant the data is in terms of the attribute being measured.

Figure 10:
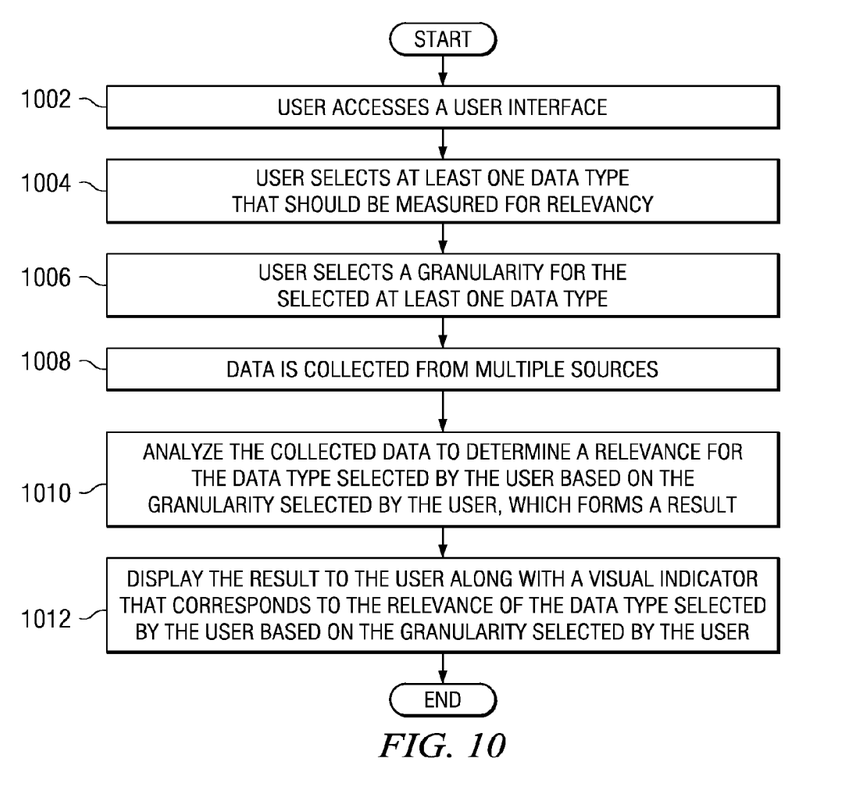
FIG. 10 is a flowchart illustrating the operation of determining the relevancy of data for a particular use, according to an exemplary embodiment.

FIG. 10 is a flowchart illustrating the operation of determining the relevancy of data for a particular use, according to an exemplary embodiment. The operation of FIG. 10 may be performed by a data processing system, such as data processing system 200 of FIG. 2. The operation begins when a user accesses a user interface, such as user interface 600 of FIG. 6 (step 1002). The user selects at least one data type that should be measured for relevancy (step 1004). The user selects a granularity for the selected at least one data type (step 1006).

Typical data types include the data age, the access, and the modification of the data. The granularity, or scope, of a data type refers to characteristics of the data type and typically include such measurements as chronological measurements, such as oldest to newest, first to last, and so forth, period of time measurements, such as never, yearly, monthly, daily, hourly, and so forth, frequency measurements, such as never, once, twice, yearly, monthly, daily, hourly, and so forth, and others, such as first, last and so forth. The data type and the granularity of the data type are used to filter collected data and indicate possible validity/relevancy of the data in question.

The operation collects data from multiple sources (step 1008). The collected data is analyzed to determine the relevance for the data type selected by the user based on the granularity selected by the user, which forms a result (step 1010). The result is then displayed to the user along with a visual indicator that corresponds to the relevance of the data type selected by the user based on the granularity selected by the user (step 1012) and the operation ends.

Thus, exemplary embodiments allow a user to determine what data records are most valid and which ones need to be deleted or ignored quickly and easily based on specific parameters chosen by the user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for managing data, the data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to generate a user interface;
   receive, by the user interface, a first selection from a user of at least one data type of a set of data types to be measured for relevancy, the set of data types comprising an age of data, a modification of data, and an access of data; and
   wherein the age of data by the first selection is used to examine for relevancy an age of data records; and
   wherein the modification of data by the first selection is used to examine for relevancy a last change and a frequency of modification of data; and
   wherein the access of data by the first selection is used to examine for relevancy a last access and a frequency of access of data;
   receive, by the user interface, a second selection from the user for a granularity of the at least one data type to be measured;
   collect a set of data records from multiple sources, wherein the set of data records are a historical record of changes to a component managed by a change management process and wherein each source may have a different historical record of changes to the component;
   analyze the set of data records to determine a relevance for the data type selected by the user based on the granularity selected by the user, which forms a result; and
   display, by the user interface, the result to the user, wherein the result includes a visual representation of the relevance of the data type selected by the user based on the granularity selected by the user.

2. The data processing system of claim 1, wherein the visual representation is a circle.

3. The data processing system of claim 1, wherein the visual representation is a horizontal bar.

4. The data processing system of claim 1, wherein the granularity is based on frequency of occurrence.

5. The data processing system of claim 1, wherein the granularity is based on a period of time.

6. The data processing system of claim 1, wherein the granularity is chronological.

7. A computer implemented method for managing data, the computer implemented method comprising:
   generating a user interface;
   receiving, by the user interface, a first selection from a user of at least one data type of a set of data types to be measured for relevancy, the set of data types comprising an age of data, a modification of data, and an access of data; and
   wherein the age of data by the first selection is used to examine for relevancy an age of data records; and
   wherein the modification of data by the first selection is used to examine for relevancy a last change and a frequency of modification of data; and wherein the access of data by the first selection is used to examine for relevancy a last access and a frequency of access of data;

receiving, by the user interface, a second selection from the user for a granularity of the at least one data type to be measured;

collecting a set of data records from multiple sources, wherein the set of data records are a historical record of changes to a component managed by a change management process and wherein each source may have a different historical record of changes to the component;

analyzing the set of data records to determine a relevance for the data type selected by the user based on the granularity selected by the user, which forms a result; and displaying, by the user interface, the result to the user, wherein the result includes a visual representation of the relevance of the data type selected by the user based on the granularity selected by the user.

8. The computer implemented method of claim 7, wherein the visual representation is a circle.

9. The computer implemented method of claim 7, wherein the visual representation is a horizontal bar.

10. The computer implemented method of claim 7, wherein the granularity is based on frequency of occurrence.

11. The computer implemented method of claim 7, wherein the granularity is based on a period of time.

12. The computer implemented method of claim 7, wherein the granularity is chronological.

13. A computer program product comprising:
a computer readable storage medium;
a plurality of computer useable program code stored in the computer readable storage medium;
the plurality of computer useable program code configured to cause a processor of a computer to perform actions comprising:
generating a user interface;
receiving, by the user interface, a first selection from a user of at least one data type of a set of data types to be measured for relevancy, the set of data types comprising an age of data, a modification of data, and an access of data; and wherein the age of data by the first selection is used to examine for relevancy an age of data records; and wherein the modification of data by the first selection is used to examine for relevancy a last change and a frequency of modification of data; and wherein the access of data by the first selection is used to examine for relevancy a last access and a frequency of access of data;

receiving, by the user interface, a second selection from the user for a granularity of the at least one data type to be measured;

collecting a set of data records from multiple sources, wherein the set of data records are a historical record of changes to a component managed by a change management process and wherein each source may have a different historical record of changes to the component;

analyzing the set of data records to determine a relevance for the data type selected by the user based on the granularity selected by the user, which forms a result; and displaying, by the user interface, the result to the user, wherein the result includes a visual representation of the relevance of the data type selected by the user based on the granularity selected by the user.

14. The computer program product of claim 13, wherein the visual representation is a circle.

15. The computer program product of claim 13, wherein the visual representation is a horizontal bar.

16. The computer program product of claim 13, wherein the granularity is based on frequency of occurrence.

17. The computer program product of claim 13, wherein the granularity is based on a period of time.

18. The computer program product of claim 13, wherein the granularity is chronological.

* * * * *